(12) United States Patent
Yan et al.

(10) Patent No.: US 12,116,497 B2
(45) Date of Patent: Oct. 15, 2024

(54) PRE-LITHIATED FILM AND PREPARATION METHOD THEREFOR AND APPLICATION THEREOF

(71) Applicants: Institute of Physics, The Chinese Academy of Sciences, Beijing (CN); Tianmulake Excellent Anode Material Co, LTD., Jiangsu (CN)

(72) Inventors: Zhao Yan, Jiangsu (CN); Fei Luo, Jiangsu (CN); Hong Li, Jiangsu (CN)

(73) Assignees: TIANMULAKE EXCELLENT ANODE MATERIAL CO. LTD., Jiangsu (CN); INSTITUTE OF PHYSICS, THE CHINESE ACADEMY OF SCIENCES, Beijing (CN)

( * ) Notice: Subject to any disclaimer, the term of this patent is extended or adjusted under 35 U.S.C. 154(b) by 819 days.

(21) Appl. No.: 17/058,988

(22) PCT Filed: Mar. 6, 2019

(86) PCT No.: PCT/CN2019/077117
§ 371 (c)(1),
(2) Date: Nov. 25, 2020

(87) PCT Pub. No.: WO2019/228003
PCT Pub. Date: Dec. 5, 2019

(65) Prior Publication Data
US 2021/0230441 A1     Jul. 29, 2021

(30) Foreign Application Priority Data
May 29, 2018   (CN) ......................... 201810529006.6

(51) Int. Cl.
*C09D 127/16*     (2006.01)
*B05D 3/14*     (2006.01)
(Continued)

(52) U.S. Cl.
CPC ............ *C09D 127/16* (2013.01); *B05D 3/144* (2013.01); *C09D 5/24* (2013.01); *C09D 7/61* (2018.01);
(Continued)

(58) Field of Classification Search
CPC ......... H01M 10/0525; H01M 10/4235; H01M 50/40; H01M 50/403; H01M 50/409; H01M 50/446; H01M 50/449; H01M 50/451
See application file for complete search history.

(56) References Cited

U.S. PATENT DOCUMENTS

2016/0028067 A1*   1/2016   Pekala ................ H01M 50/489
                                                     156/247
2016/0204415 A1*   7/2016   Takanashi ......... H01M 10/0585
                                                     429/223

FOREIGN PATENT DOCUMENTS

CN           105206780 A     12/2015
CN           103700860 B     4/2016
(Continued)

OTHER PUBLICATIONS

Machine Translation of JP2014-170661 (Year: 2014).*
(Continued)

*Primary Examiner* — Wyatt P McConnell
(74) *Attorney, Agent, or Firm* — TraskBritt (57) ABSTRACT

A pre-lithiated film and a preparation method therefor and an application thereof. The pre-lithiated film comprises: a 1 μm-50 μm base film and a 0.02 μm-100 μm pre-lithiated coating coated on the base film; the pre-lithiated coating includes: 1 wt %-99.99 wt % of a pre-lithiated material, 0 wt %-98.99 wt % of a coating material, 0.01 wt %-10 wt % of a binder, 0 wt %-10 wt % of a conductive additive material, 0 wt %-2 wt % of a dispersing agent and 0 wt %-2 wt % of an aid. The pre-lithiated material is a material that can
(Continued)

produce an electrochemical reaction to release lithium ions under voltage control. The pre-lithiated material specifically includes: $Li_xM1_yA_z$, $Li_xM2_y(PO_4)_z$, $Li_xM2_y(SiO_4)_z$, $Li_2S$, and $Li_xM1_yS_z$, wherein x, y and z are integers or non-integers and satisfy the balance of electrovalence of a chemical formula; M1 is one or a combination of a metallic element, a transition metal element, a rare earth element, an alkali metal, an IVA group element; $M_2$ is one or a combination of a metal element, a transition metal element, a rare earth element, an alkali metal, and an IVA group element; and A is one or a combination of O, F, Cl, S and N elements.

9 Claims, 5 Drawing Sheets (51) Int. Cl.
| | |
|---|---|
| *C09D 5/24* | (2006.01) |
| *C09D 7/40* | (2018.01) |
| *C09D 7/61* | (2018.01) |
| *H01M 4/04* | (2006.01) |
| *H01M 4/1391* | (2010.01) |
| *H01M 4/36* | (2006.01) |
| *H01M 4/525* | (2010.01) |
| *H01M 4/62* | (2006.01) |
| *H01M 10/0525* | (2010.01) |

(52) U.S. Cl.
CPC ............... *C09D 7/67* (2018.01); *C09D 7/68* (2018.01); *C09D 7/70* (2018.01); *H01M 4/0404* (2013.01); *H01M 4/1391* (2013.01); *H01M 4/366* (2013.01); *H01M 4/525* (2013.01); *H01M 4/623* (2013.01); *H01M 10/0525* (2013.01); *B05D 2506/10* (2013.01)

(56) References Cited

FOREIGN PATENT DOCUMENTS

| | | |
|---|---|---|
| CN | 105702913 A | 6/2016 |
| CN | 106684291 A | 5/2017 |
| CN | 105098188 B | 9/2017 |
| CN | 108565396 A | 9/2018 |
| CN | 106910860 B | 11/2020 |
| JP | 2005-536858 A | 12/2005 |
| JP | 2011-503828 A | 1/2011 |
| JP | 2012-510543 A | 5/2012 |
| JP | 2014-017089 A | 1/2014 |
| JP | 2014-170661 A | 9/2014 |
| JP | 2016-213006 A | 12/2016 |
| JP | 2017-204368 A | 11/2017 |
| KR | 10-2011-0070874 A | 6/2011 |
| KR | 10-2016-0128014 A | 11/2016 |

OTHER PUBLICATIONS

Chinese First Office Action for Application No. 201810529006.6 dated Mar. 5, 2020, 8 pages.
Chinese Search Report for Chinese Application No. 2018105290066 dated Mar. 5, 2020, 1 pages.
Chinese Second Office Action for Chinese Application No. 201810529006.6 dated Sep. 5, 2020, 9 pages.
Japanese Office Action for Japanese Application No. 2020-567074 daterd Aug. 18, 2022, 5 pages.
International Search Report for International Application No. PCT/CN2019/077117 dated Jun. 11, 2019, 2 pages.
International Written Opinion for International Application No. PCT/CN2019/077117 dated Jun. 11, 2019, 4 pages.
Korean Office Action for Application No. 10-2020-7034313 dated Dec. 22, 2022, 20 pages.

\* cited by examiner

PRE-LITHIATED FILM AND PREPARATION METHOD THEREFOR AND APPLICATION THEREOF

CROSS-REFERENCE TO RELATED APPLICATIONS

This application is a national phase entry under 35 U.S.C. § 371 of International Patent Application PCT/CN2019/077117, filed Mar. 6, 2019, designating the United States of America and published as International Patent Publication WO 2019/228003 A1 on Dec. 5, 2019, which claims the benefit under Article 8 of the Patent Cooperation Treaty to Chinese Patent Application Serial No. 201810529006.6, filed May 29, 2018.

TECHNICAL FIELD

The present disclosure claims priority to Chinese Patent application submitted to China National Intellectual Property Administration on May 29, 2018, Application No. 201810529006.6, and entitled "Pre-lithiated Film and Preparation Method and Application Thereof."

The present disclosure relates to the technical field of lithium battery materials, in particular, to a pre-lithiated film and a preparation method and application thereof.

BACKGROUND

Lithium ion batteries are high in output voltage and energy density, long in cycle life, good in safety performance and free of memory effect, thus having been used as principal energy storage devices in the mobile power field. To further satisfy the requirements of power grids, electric vehicles and consumer electronics products for energy storage devices, electrode materials and lithium battery systems with a longer cycle life, better safety performance and a higher energy density have become research hotspots.

In the working process of the lithium batteries, lithium ions shuttle back and forth in the anode and the cathode. The energy density of the lithium batteries depends to a large extent on the quantity of active lithium ions in the batteries. However, anode materials and cathode materials in existing commercial lithium batteries generally consume lithium ions irreversibly in the initial cycle. Thus, it has become an effective means to effectively improve the energy density of the lithium batteries by supplementing lithium ions.

Existing pre-lithiation techniques typically include cathode pre-lithiation and anode pre-lithiation, wherein metallic lithium or highly reductive lithiated materials, which are often used as lithium sources for cathode pre-lithiation have high environmental requirements in the preparation and using process, and are extremely dangerous. In the process of anode pre-lithiation, lithiated materials and anode materials are directly coated at the same time, so that the consumption of the anode materials is reduced, thus reducing the reversible capacity of batteries.

In view of this, there is an urgent need to provide a pre-lithiation method to realize mass production and application.

BRIEF SUMMARY

The present disclosure provides a pre-lithiated film and a preparation method and application thereof. The pre-lithiated film of the present disclosure comprises a base film, and a pre-lithiated material, a binder, an additive and an aid coated on the surface of the base film. When a battery adopting the pre-lithiated film of the present disclosure runs in the initial cycle, the pre-lithiated film releases lithium ions to compensate for the loss of lithium ions of electrode materials in the initial cycle and has the advantages of ceramic membranes, so that the service temperature and liquid absorptivity of the film are improved. The preparation method of the pre-lithiated film is simple and has low environmental requirements, raw materials are abundant, the process is simple, and mass production is facilitated. The pre-lithiated film provided by the present disclosure can be applied to liquid-state lithium ion batteries, quasi-solid-state lithium ion batteries, all-solid-state batteries and lithium metal batteries.

In a first aspect, an embodiment of the present disclosure provides a pre-lithiated film, which comprises: a 1 μm-50 μm base film and a 0.02 μm-100 μm pre-lithiated coating coated on the base film;

The pre-lithiated coating includes: 1 wt %-99.99 wt % of a pre-lithiated material, 0 wt %-98.99 wt % of a coating material, 0.01 wt %-0 wt % of a binder, 0%-10 wt % of a conductive additive material, 0 wt %-2 wt % of a dispersing agent and 0 wt %-2 wt % of an aid;

wherein, the pre-lithiated material is a material that can produce an electrochemical reaction to release lithium ions under voltage control; the pre-lithiated material specifically includes: $Li_xM1_yA_z$, $Li_xM2_y(PO4)_z$, $Li_xM2_y(SiO4)_z$, $Li_2S$, or $Li_xM1_yS_z$;

x, y and z are integers or non-integers and satisfy the balance of electrovalence of a chemical formula; M1 is one or a combination of more than one of a metallic element, a transition metallic element, a rare earth element, an alkali metallic element and an IVA group element; M2 is one or a combination of several of a metallic element, a transition metallic element, and an IVA group element; A is one or a combination of more than one of O, F, Cl, S and N elements; wherein, the pre-lithiated material is transformed into a material containing a lithium source or a material not containing a lithium source after charging formation;

The material containing the lithium source includes: $Li_aM1_bA_c$, $Li_aM2_b(PO4)_c$ or $Li_aM2_b(SiO_4)_c$, $Li_2S$ and $Li_aM1_bS_c$, wherein a, b and c are integers or non-integers and satisfy the balance of electrovalence of a chemical formula;

The material not containing the lithium source includes one or a combination of several of CuO, $Cu_2O$, $Fe_2O_3$, $Fe_3O_4$, FeO, $Al_2O_3$, $Co_3O_4$, $Co_2O_3$, $V_2O_5$, MnO, $Mn_2O_3$, NiO, MgO, $TiO_2$, $AlPO_4$, $TiPO_4$, $CoPO_4$, $MnPO_4$, $Ni_3(PO4)_2$, $Mg_3(PO4)_2$ and $Co_2(PO4)_3$.

Preferably, the pre-lithiated material includes one or a combination of several of $Li_xCu_yO_z$, $Li_xFe_yO_z$, $Li_xAl_yO_z$, $Li_xV_yO_z$, $Li_xCo_yO_z$, $Li_xMn_yO_z$, $Li_xNi_yO_z$, $Li_2C_2O_4$, $Li_xMg_yO_z$, $Li_xTi_yO_z$, $Li_xCu_y(PO_4)_z$, $Li_xFe_y(PO_4)_z$, $Li_xAl_y(PO_4)_z$, $Li_xV_y(PO_4)_z$, $Li_xMn_y(PO_4)_z$, $Li_xNi_y(PO_4)_z$, $Li_xCu_y(O_{c1}S_{c2})_z$, $Li_xCu_y(O_{c1}Fe_2)_z$, $Li_x(FeZn)_yO_z$, $Li_xFe_y(O_{c1}Cl_{c2})_z$, $Li_xMg_y(PO_4)_z$ and $Li_xTi_y(PO_4)_z$, wherein x, y, c1, c2 and z are integers or non-integers and satisfy the balance of electrovalence of a chemical formula.

Preferably, the base film is one or a combination of several of a polypropylene PP membrane, a PE membrane, a non-woven membrane, a fiber membrane, a ceramic membrane and a solid electrolyte membrane.

Preferably, the pre-lithiated material is spherical, ellipsoidal or irregular polygonal particles and has a size of 50 nm-5000 nm.

Preferably, the coating material includes one or a combination of several of a ceramic material, a polymer material, a piezoelectric material, a heat-conductive material and a conductive material;

The binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene;

The conductive additive is one or a mixture of several of carbon black, conductive graphite, carbon fiber, carbon nano tubes, acetylene black, Ketjen carbon, graphene, metallic silver, metallic gold, vapor-grown carbon fiber (VGCF), conductive graphite KS-6, and carbon black SUPER-P;

The dispersing agent is one or more of several of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispensing agent;

The aid is one or a combination of several of polydimethylsiloxane, silicone oil, polyether, sodium polyacrylate, polyvinyl alcohol, sodium alkyl polyoxyethylene ether carboxylate, polyxyethylated alkylphenol, sodium alkyl benzene sulfonate, alkylphenol polyoxyethylene ether, polyoxyethylene alkyl amine and polyoxyethylene amide.

In a second aspect, an embodiment of the present disclosure provides a preparation method for preparing the pre-lithiated film according to the first aspect. The preparation method comprises:

Adding a dispersing agent, a binder, a conductive additive, an aid and a solvent into a pre-mixing tank in a required proportion to be completely dissolved to obtain a first mixture, wherein the solvent is a polar solvent and includes deionized water, N-methylpyrrolidone NMP, ethyl alcohol or Dimethylformamide DMF; the binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene; the conductive additive is one or a mixture of several of carbon black, conductive graphite, carbon fiber, carbon nano tubes, acetylene black, Ketjen carbon, graphene, metallic silver, metallic gold, VGCF, KS-6 and SUPER-P; the water-soluble dispersing agent is one or more of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispensing agent; the aid is one or a combination of several of polydimethylsiloxane, silicone oil, polyether, sodium polyacrylate, polyvinyl alcohol, sodium alkyl polyoxyethylene ether carboxylate, polyxyethylated alkylphenol, sodium alkyl benzene sulfonate, alkylphenol polyoxyethylene ether, polyoxyethylene alkyl amine and polyoxyethylene amide.

Stepwise adding a pre-lithiated material and a coating material into the first mixture in a required proportion to be stirred at a high speed of 10-5000 rpm and be dispersed to obtain a second mixture, wherein the pre-lithiated material is a material that can produce an electrochemical reaction to release lithium ions under voltage control, and includes $Li_xM1_yA_z$, $Li_xM2_y(PO_4)_z$, $Li_xM2_y(SiO_4)_z$, $Li_2S$, or $Li_xM1_yS_z$, wherein x, y and z are integers or non-integers and satisfy the balance of electrovalence of a chemical formula; M1 is one or a combination of more than one of a metallic element, a transition metallic element, a rare earth element, an alkali metallic element, and an IVA group element; M2 is one or a combination of more than one of a metallic element, a transition metallic element, and an IVA group element; A is one or a combination of more than one of O, F, Cl, S and N elements; wherein, the coating material includes one or a combination of several of a ceramic material, a polymer material, a piezoelectric material, a heat-conductive material and an electrical conductive material;

Filtering the second mixture with a screen to obtain coating slurry; and

Coating the coating slurry on one side or two sides of a base film at a speed of 1 m/min-100 m/min, and drying the base film under a temperature of 40° C.-100° C. to obtain the pre-lithiated film, wherein the base film is any one of a PP membrane, a PE membrane, a non-woven membrane and a fiber membrane.

Preferably, before the step of coating the coating slurry on one side or two sides of a base film at a speed of 1 m/min-100 m/min, the method further comprises:

Carrying out corona treatment on the base film.

In a third aspect, an embodiment of the present disclosure provides a method for pre-lithiating the pre-lithiated film according to the first aspect. The method comprises:

Assembling a lithium battery using the pre-lithiated film as a membrane material, wherein a side, coated with the pre-lithiated coating, of the pre-lithiated film is assembled close to an anode of the lithium battery; and Charging the assembled lithium battery for formation;

Wherein, the lithium battery is one or more of a liquid-state lithium battery, a quasi-solid-state lithium battery and a solid-state battery according to the structural composition;

Or, the lithium battery is one or more of a cylindrical lithium battery, a square lithium battery, a pouch lithium battery, a laminated lithium battery and a button lithium battery according to the outline structure.

In a fourth aspect, an embodiment of the present disclosure provides a lithium battery comprising the pre-lithiated film according to the first aspect.

The pre-lithiated film comprises a base film, and a pre-lithiated material, a binder, an additive and an aid coated on the surface of the base film. When a battery adopting the pre-lithiated film of the present disclosure runs in the initial cycle, the pre-lithiated film releases lithium ions to compensate for the loss of lithium ions of electrode materials in the initial cycle and has the advantages of ceramic membranes, so that the service temperature and liquid absorptivity of the film are improved. The preparation method of the pre-lithiated film is simple and has low environmental requirements, raw materials are abundant, the process is simple, and mass production is facilitated. The pre-lithiated film provided by the present disclosure can be applied to liquid-state lithium ion batteries, quasi-solid-state lithium ion batteries, all-solid-state batteries and lithium metal batteries.

BRIEF DESCRIPTION OF THE DRAWINGS

The technical solutions of the embodiments of the present disclosure are described below in further detail with reference to accompanying drawings and embodiments.

DETAILED DESCRIPTION

A further detailed description of the present disclosure is provided below in conjunction with the embodiments, but is not intended to limit the protection scope of the present disclosure.

Figure 1:
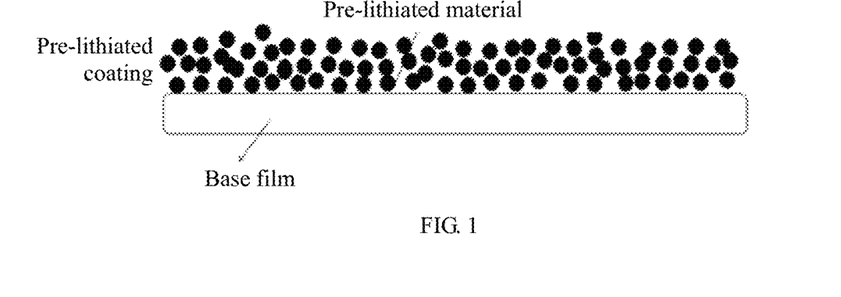
FIG. 1 is a structural diagram of a pre-lithiated film provided by an embodiment of the present disclosure.

An embodiment of the present disclosure provides a pre-lithiated film, which comprises: a 1 μm-50 μm base film and a 0.02 μm-100 μm pre-lithiated coating coated on the base film, as shown in FIG. 1.

The pre-lithiated coating includes: 1 wt %-99.99 wt % of a pre-lithiated material, 0 wt %-98.99 wt % of a coating material, 0.01 wt %-0 wt % of a binder, 0%-10 wt % of a conductive additive material, 0 wt %-2 wt % of a dispersing agent and 0 wt %-2 wt % of an aid;

Wherein, the pre-lithiated material is a material that can produce an electrochemical reaction to release lithium ions under voltage control; the pre-lithiated material specifically includes $Li_xM1_yA_z$, $Li_xM2_y(PO_4)_z$, $Li_xM2_y(SiO_4)_z$, $Li_2S$, or $Li_xM1_yS_z$; x, y and z are integers or non-integers and satisfy the balance of electrovalence of a chemical formula; M1 is one or a combination of more than one of a metallic element, a transition metallic element, a rare earth element, an alkali metallic element and an IVA group element; M2 is one or a combination of more than one of a metallic element, a transition metallic element and an IVA group element.

In addition, the pre-lithiated material includes $Li_xM1_yA_z$, wherein A is one of O, F, Cl, S and N elements or a combination of several of O, F, Cl, S and N elements.

Furtherly, the pre-lithiated material further includes one or a combination of several of $Li_xCu_yO_z$, $Li_xFe_yO_z$, $Li_xAl_yO_z$, $Li_xV_yO_z$, $Li_xCo_yO_z$, $Li_xMn_yO_z$, $Li_xNi_yO_z$, $Li_2C_2O_4$, $Li_xMg_yO_z$, $Li_xTi_yO_z$, $Li_xCu_y(PO_4)_z$, $Li_xFe_y(PO_4)_z$, $Li_xAl_y(PO_4)_z$, $Li_xV_y(PO_4)_z$, $Li_xMn_y(PO_4)_z$, $Li_xNi_y(PO_4)_z$, $Li_xMg_y(PO_4)_z$ and $Li_xTi_y(PO_4)_z$.

In addition, the pre-lithiated material may further include: $Li_xCu_y(O_{c1}S_{c2})_z$, $Li_xCu_y(O_{c1}F_{c2})_z$, $Li_x(FeZn)_yO_z$ or $Li_xFe_y(O_{c1}Cl_{c2})_z$. In chemical formulas of the pre-lithiated material, x, y, c1, c2 and z are integers or non-integers and satisfy the balance of electrovalence of the chemical formulas.

The pre-lithiated material is transformed into a material containing a lithium source or a material not containing a lithium source after charging formation. Wherein, the material containing the lithium source includes: $Li_aM1_bA_c$, $Li_aM2_b(PO_4)_c$, $Li_aM2_b(SiO_4)_c$, $Li_2S$ or $Li_aM1_bS_c$, wherein a, b and c are integers or non-integers and satisfy the balance of electrovalence of a chemical formula. Of course, the pre-lithiated material may include $Li_aM1_bA_c$.

Furthermore, the material containing the lithium source includes one or a combination of several of $Li_xCu_yO_z$, $Li_xFe_yO_z$, $Li_xAl_yO_z$, $Li_xV_yO_z$, $Li_xCo_yO_z$, $Li_xMn_yO_z$, $Li_xNi_yO_z$, $Li_2C_2O_4$, $Li_xMg_yO_z$, $Li_xTi_yO_z$, $Li_xCu_y(PO_4)_z$, $Li_xFe_y(PO_4)_z$, $Li_xAl_y(PO_4)_z$, $Li_xV_y(PO_4)_z$, $Li_xMn_y(PO_4)_z$, $Li_xNi_y(PO_4)_z$, $Li_xMg_y(PO_4)_z$ and $Li_xTi_y(PO_4)_z$.

The material not containing the lithium source includes one or a combination of several of S, CuO, $Cu_2O$, $Fe_2O_3$, $Fe_3O_4$, FeO, $Al_2O_3$, $Co_3O_4$, $Co_2O_3$, $V_2O_5$, MnO, $Mn_2O_3$, NiO, MgO, $TiO_2$, $AlPO_4$, $TiPO_4$, $CoPO_4$, $MnPO_4$, $Ni_3(PO4)_2$, $Mg_3(PO4)_2$ and $Co_2(PO_4)_3$.

The base film is one or a combination of several of a PP membrane, a PE membrane, a non-woven membrane, a fiber membrane, a ceramic membrane and a solid electrolyte membrane.

The pre-lithiated material is spherical, ellipsoidal or irregular polygonal particles and has a size of 50 nm-5000 nm.

The coating material includes one or a combination of several of a ceramic material, a polymer material, a piezoelectric material, a heat-conductive material and an electrically conductive material, and specifically includes $Al_2O_3$, $BaTiO_3$, Polyvinylidene fluoride hexafluoropropylene (PVDF-HFP), Polyvinylidene fluoride (PVDF), Polyoxyethylene (PEO), $TiO_2$, Polymethyl methacrylate (PMMA), CuO, a solid electrolyte, a conductive carbon material, or the like.

The binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene;

The conductive additive is one or a mixture of several of carbon black, conductive graphite, carbon fiber, carbon nano tubes, acetylene black, Ketjen carbon, graphene, metallic silver, metallic gold, Vapor-grown carbon fiber (VGCF), conductive graphite KS-6, and carbon black SUPER-P;

The dispersing agent is one or more of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispensing agent;

The aid is one or a combination of several of polydimethylsiloxane, silicone oil, polyether, sodium polyacrylate, polyvinyl alcohol, sodium alkyl polyoxyethylene ether carboxylate, polyxyethylated alkylphenol, sodium alkyl benzene sulfonate, alkylphenol polyoxyethylene ether, polyoxyethylene alkyl amine and polyoxyethylene amide.

The pre-lithiated film of the present disclosure comprises a base film, and a pre-lithiated material, a binder, an additive and an aid coated on the surface of the base film. When a battery adopting the pre-lithiated film of the present disclosure runs in the initial cycle, the pre-lithiated film releases lithium ions to compensate for the loss of lithium ions of electrode materials in the initial cycle and has the advantages of ceramic membranes, so that the service temperature and liquid absorptivity of the film are improved. The pre-lithiated film provided by the present disclosure can be applied to liquid-state lithium ion batteries, quasi-solid-state lithium ion batteries, all-solid-state batteries and lithium metal batteries.

A preparation method of a pre-lithiated film provided by embodiments of the present disclosure is introduced below.

Figure 2:
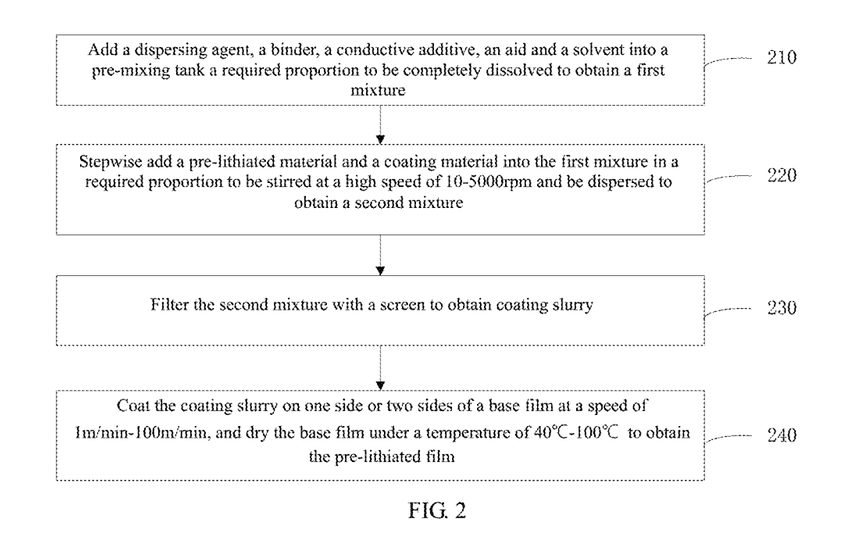
FIG. 2 is a flow diagram of a preparation method of a pre-lithiated film provided by an embodiment of the present disclosure.

As shown in FIG. 2, the preparation method of a pre-lithiated film provided by this embodiment comprises the following steps:

Step 210: a dispersing agent, a binder, a conductive additive, an aid and a solvent in a required proportion are added into a pre-mixing tank to be completely dissolved to obtain a first mixture;

The solvent is a polar solvent and includes deionized water, N-methylprolinodone (NMP), ethyl alcohol or Dimethylformamide DMF; the binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene; the conductive additive is one or a mixture of several of carbon black, conductive graphite, carbon fiber, carbon nano tubes, acetylene black, Ketjen carbon, graphene, metallic silver, metallic gold, VGCF, conductive graphite KS-6, carbon black SUPER-P; the water-soluble dispersing agent is one or more of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispersing agent; the aid is one or a combination of several of polydimethylsiloxane, silicone oil, polyether, sodium polyacrylate, polyvinyl alcohol, sodium alkyl polyoxyethylene ether carboxylate, polyxyethylated alkylphenol, sodium alkyl benzene sulfonate, alkylphenol polyoxyethylene ether, polyoxyethylene alkyl amine and polyoxyethylene amide.

Step 220: a pre-lithiated material and a coating material are stepwise added into the first mixture in a required proportion to be stirred at a high speed of 10-5000 rpm and be dispersed to obtain a second mixture;

Wherein, the pre-lithiated material is a material that can produce an electrochemical reaction to release lithium ions under voltage control, and includes $Li_xM1_yA_z$, $Li_xM2_y(PO_4)_z$, $Li_xM2_y(SiO_4)_z$, $Li_2S$, or $Li_xM1_yS_z$, wherein x, y and z are integers or non-integers and satisfy the balance of electrovalence of a chemical formula; M1 is one or a combination of more than one of a metallic element, a transition metallic element, a rare earth element, an alkali metallic element, and an IVA group element; M2 is one or a combination of more than one of a metallic element, a transition metallic element, and an IVA group element; the coating material includes one or a combination of several of a ceramic material, a polymer material, a piezoelectric material, a heat-conductive material and an electrical conductive material. In addition, the pre-lithiated material includes $Li_xM1_yA_z$, A is one of O, F, Cl, S and N elements or a combination of O, F, Cl, S and N elements.

Step 230: the second mixture is filtered with a screen to obtain coating slurry;

Step 240: the coating slurry is coated on one side or two sides of a base film at a speed of 1 m/min-100 m/min, and the base film is dried under a temperature of 40° C.-100° C. to obtain the pre-lithiated film.

Wherein, the base film is any one of a PP membrane, a PE membrane, a non-woven membrane and a fiber membrane.

Preferably, before this step, corona treatment may be carried out on the base film.

The preparation method of the pre-lithiated film is easy to implement and has low environmental requirements, raw materials are redundant, the process is simple, and mass production is facilitated.

The pre-lithiated film of the present disclosure is assembled to a battery and is pre-lithiated, and a lithium battery is assembled using the pre-lithiated film as a membrane material, wherein the side, coated with the pre-lithiated coating, of the pre-lithiated film is assembled close to an anode of the lithium battery; and then, the assembled lithium battery is charged for formation, the assembled lithium battery is classified according to the structural composition, including one or more of a liquid-state lithium battery, a quasi-solid-state lithium battery and a solid-state battery; or the assembled lithium battery is classified according to the outline structure, including one or more of a cylindrical lithium battery, a square lithium battery, a pouch lithium battery, a laminated lithium battery and a button lithium battery.

When the battery adopting the pre-lithiated film of the present disclosure runs in the initial cycle, the pre-lithiated film releases lithium ions to compensate for the loss of lithium ions of electrode materials in the initial cycle and has the advantages of ceramic membranes, so that the service temperature and liquid absorptivity of the film are improved.

The technical solutions of the present disclosure are further expounded below in conjunction with specific embodiments.

Embodiment 1

This embodiment provides a pre-lithiated film, which comprises a base film and a pre-lithiated coating formed by lithiated slurry coated on one side of the base film, wherein the base film is a porous polypropylene(PP) membrane and has a thickness of 16 μm, and the lithiated slurry is coated on one side of the base film by a thickness of 2 μm to form the pre-lithiated coating. The coating slurry comprises, by mass, 20% of a lithiated compound and 80% of NMP; wherein, the lithiated compound is prepared from, by mass, 50% of lithiated material $Li_2CuO_2$ powder with a granularity D50 of 1 μm and 50% of a binder PVDF.

The pre-lithiated film in this embodiment is prepared through the following method, which comprises:

the binder PVDF and deionized water were added into a pre-mixing tank in the proportion mentioned above to be completely dissolved to obtain a mixture I;

the lithiated material $Li_2CuO_2$ powder was stepwise added into the mixture I to be stirred and dispersed at a high speed to obtain a mixture II, wherein the stirring speed is 50 rpm, and the dispersing speed is 1700 rpm;

(3) The mixture II was filtered with a 400-mesh screen to obtain coating slurry; and (4) The coating slurry was coated on a side, subjected to corona treatment, of the base film at a speed of 5 m/min and dried at a temperature of 50° C. to obtain the pre-lithiated film.

Figure 3:
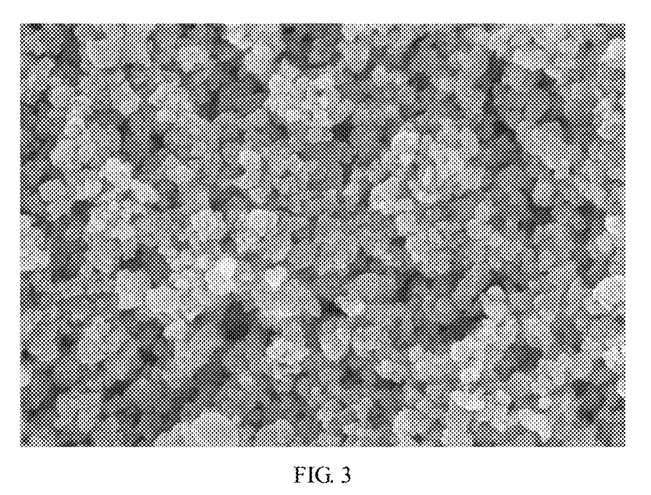
FIG. 3 is an SEM image of a pre-lithiated film provided by Embodiment 1 of the present disclosure.

FIG. 3 illustrates an SEM image of the pre-lithiated film provided by Embodiment 1 of the present disclosure. It can be seen from FIG. 3 that the lithiated material is uniformly distributed.

Figure 4:
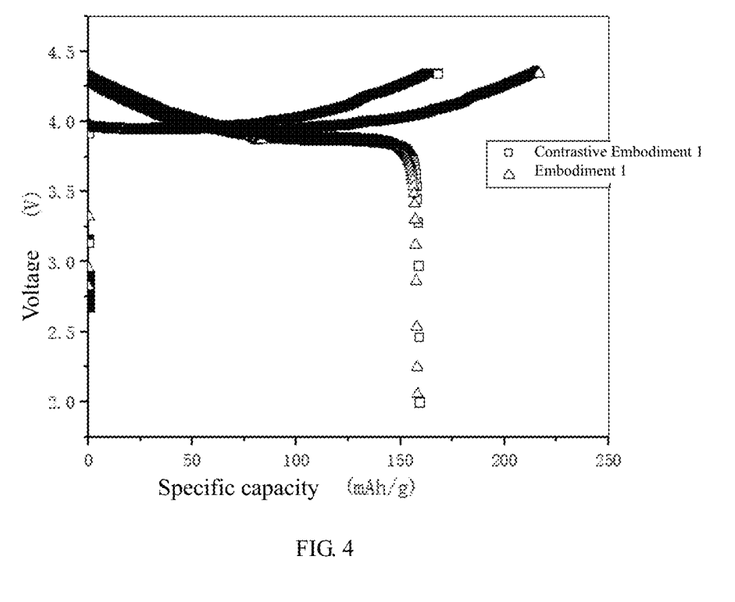
FIG. 4 is a performance test chart of a pre-lithiated film half-cell provided by Embodiment 1 of the present disclosure.

The pre-lithiated film provided by Embodiment 1 of the present disclosure was assembled together with an anode coated with a lithium cobalt oxide anode material, metallic lithium and an electrolyte to form a half-cell, the performance of which was tested. Test results are shown in FIG. 4.

Embodiment 2

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 10 μm to form the pre-lithiated coating. The coating slurry comprises, by mass, 20% of a lithiated compound and 80% of NMP; wherein, the lithiated compound is prepared from, by mass, 50% of lithiated material $Li_2CuO_2$ powder with a granularity D50 of 1 μm and 50% of a binder PVDF.

A preparation method of the pre-lithiated film in this embodiment is identical with the preparation method in Embodiment 1.

Figure 5:
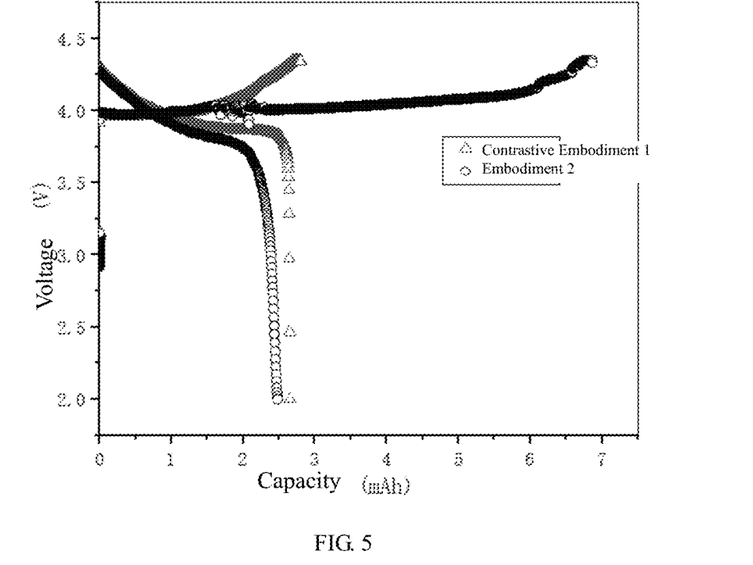
FIG. 5 is a performance test comparison diagram of a pre-lithiated film half-cell provided by Embodiment 2 of the present disclosure and a contrastive Embodiment 1.

The pre-lithiated film provided by this embodiment was assembled together with an anode coated with a lithium cobalt oxide anode material, metallic lithium and an electrolyte to form a half-cell, the performance of which was tested. Test results are shown in FIG. 5.

The pre-lithiated film provided by this embodiment is assembled together with an anode coated with a nickel cobalt manganese ternary (NCM) anode material, a cathode coated with an SC400 cathode material, and an electrolyte to form a half-cell, the performance of which was tested. Test results were shown in FIG. 6.

Embodiment 3

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 10 μm to form the pre-lithiated coating. The coating slurry comprises, by mass, 20% of a lithiated compound and 80% of NMP; wherein, the lithiated compound is prepared from, by mass, 20% of lithiated material $Li_2CuO_2$ powder with a granularity D50 of 1 μm, 20% of alumina powder, and 50% of a binder PVDF with a granularity D50 of 200 nm.

A preparation method of the pre-lithiated film in this embodiment is identical with the preparation method in Embodiment 1.

The pre-lithiated film provided by this embodiment was assembled together with an anode coated with a lithium cobalt oxide anode material, metallic lithium and an electrolyte to form a half-cell, the performance of which was tested. Test results are shown in FIG. 1.

Embodiment 4

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 10 μm to form the pre-lithiated coating. The coating slurry comprises, by mass, 20% of a lithiated compound and 80% of deionized water; wherein, the lithiated compound is prepared from, by mass, 96% of lithiated material $Li_2CuO_2$ powder with a granularity D50 of 1 μm, 1% of a binder Sodium carboxymethyl cellulose, 1% of a binder butylbenzene latex, 1% of a dispersing agent polyethylene glycol, and 1% of an aid octylphenol polyoxyethylene.

A preparation method of the pre-lithiated film in this embodiment is identical with the preparation method in Embodiment 1.

The pre-lithiated film provided by this embodiment was assembled together with an anode coated with a lithium cobalt oxide anode material, metallic lithium and an electrolyte to form a half-cell, the performance of which was tested. Test results are shown in FIG. 1.

Embodiment 5

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 10 μm to form the pre-lithiated coating. The coating slurry comprises, by mass, 20% of a lithiated compound and 80% of NMP; wherein, the lithiated compound is prepared from, by mass, 50% of lithiated material $Li_5FeO_4$ powder with a granularity D50 of 200 μm and 50% of a binder PVDF.

A preparation method of the pre-lithiated film in this embodiment is identical with the preparation method in Embodiment 1.

Embodiment 6

This embodiment provides a pre-lithiated film which comprises a base film and a pre-lithiated coating formed by lithiated slurry coated on one side of the base film, wherein the base film is a ceramic membrane and has a thickness of 12 μm, and the lithiated slurry is coated on one side of the base film by a thickness of 10 μm to form the pre-lithiated coating. The coating slurry comprises, by mass, 20% of a lithiated compound and 80% of NMP; wherein, the lithiated compound is prepared from, by mass, 60% of lithiated material $Li_2CuO_2$ powder with a granularity D50 of 200 μm and 40% of a binder PVDF.

A preparation method of the pre-lithiated film in this embodiment is identical with the preparation method in Embodiment 1.

Embodiment 7

This embodiment provides a pre-lithiated film, which comprises a base film and a pre-lithiated coating formed by lithiated slurry coated on one side of the base film, wherein the base film is a porous PP membrane and has a thickness of 10 μm, and the lithiated slurry is coated on one side of the base film by a thickness of 5 μm to form the pre-lithiated coating. The coating slurry comprises, by mass, 20% of a lithiated compound and 80% of NMP; wherein, the lithiated compound is prepared from, by mass, 50% of lithiated material $Li_{1.8}CuO_{1.8}F_{0.2}$ powder with a granularity D50 of 2 μm and 50% of a binder PVDF.

A preparation method of the pre-lithiated film in this embodiment is identical with the preparation method in Embodiment 1.

Figure 7:
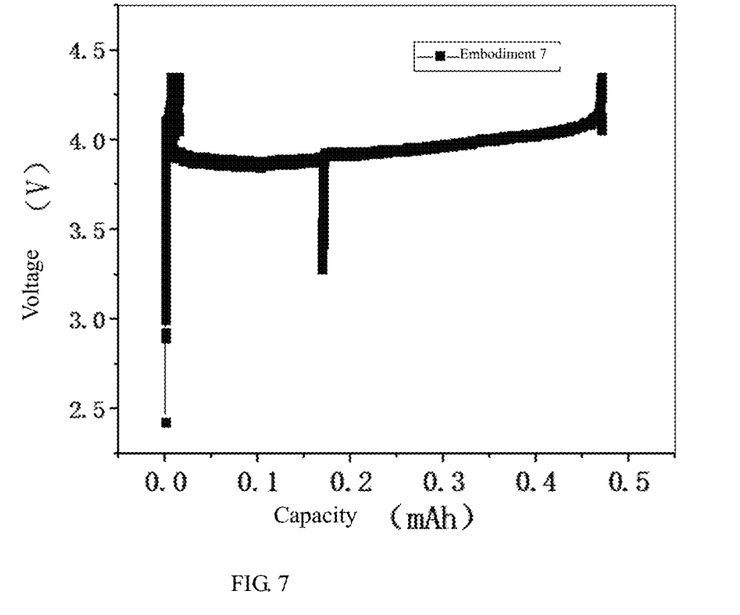
FIG. 7 is a performance test chart of a pre-lithiated film half-cell provided by Embodiment 7 of the present disclosure.

The pre-lithiated film provided by this embodiment was assembled together with aluminum foil, metallic lithium and an electrolyte to form a half-cell, the performance of which was tested. Test results were shown in FIG. 7.

Embodiment 8

This embodiment provides a pre-lithiated film, which comprises a base film and a pre-lithiated coating formed by lithiated slurry coated on one side of the base film, wherein the base film is a porous PP membrane and has a thickness of 10 μm, and the lithiated slurry is coated on one side of the base film by a thickness of 3 μm to form the pre-lithiated coating. The coating slurry comprises, by mass, 20% of a lithiated compound and 80% of NMP; wherein, the lithiated compound is prepared from, by mass, 50% of lithiated material $Li_{4.8}FeO_{3.8}F_{0.2}$ powder with a granularity D50 of 2 μm and 50% of a binder PVDF.

A preparation method of the pre-lithiated film in this embodiment is identical with the preparation method in Embodiment 1.

Figure 8:
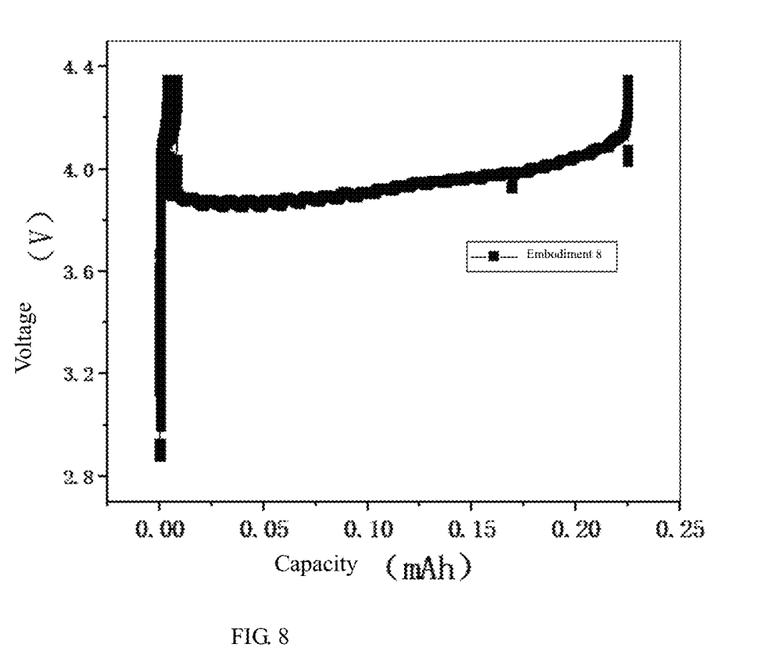
FIG. 8 is a performance test chart of a pre-lithiated film half-cell provided by Embodiment 8 of the present disclosure.

The pre-lithiated film provided by this embodiment was assembled together with aluminum foil, metallic lithium and an electrolyte to form a half-cell, the performance of which was tested. Test results are shown in FIG. 8.

Embodiment 9

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 3 μm to form the pre-lithiated coating. The coating slurry comprises, by mass, 20% of a lithiated compound and 80% of NMP; wherein, the lithiated compound is prepared from, by mass, 50% of lithiated material $Li_5FeO_{3.8}S_{0.2}$ powder with a granularity D50 of 1 μm and 50% of a binder PVDF.

A preparation method of the pre-lithiated film in this embodiment is identical with the preparation method in Embodiment 1.

Figure 9:
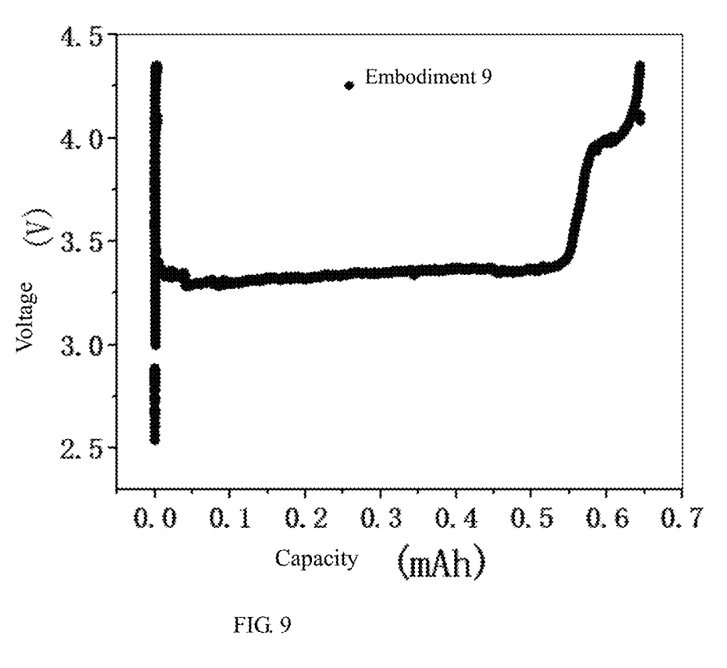
FIG. 9 is a performance test chart of a pre-lithiated film half-cell provided by Embodiment 9 of the present disclosure.

The pre-lithiated film provided by this embodiment was assembled together with aluminum foil, metallic lithium and an electrolyte to form a half-cell, the performance of which was tested. Test results are shown in FIG. 9.

Embodiment 10

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 3 μm to form the pre-lithiated coating. The coating slurry comprises, by mass, 20% of a lithiated compound and 80% of NMP; wherein, the lithiated compound is prepared from, by mass, 50% of lithiated material $Li_{1.9}CuO_{1.9}Cl_{0.1}$ powder with a granularity D50 of 2 μm and 50% of a binder PVDF.

A preparation method of the pre-lithiated film in this embodiment is identical with the preparation method in Embodiment 1.

Embodiment 11

This embodiment provides a pre-lithiated film, which comprises a base film and a pre-lithiated coating formed by lithiated slurry coated on one side of the base film, wherein the base film is a porous PP membrane and has a thickness of 16 μm, and the lithiated slurry is coated on one side of the base film by a thickness of 5 μm to form the pre-lithiated coating. The coating slurry comprises, by mass, 20% of a lithiated compound and 80% of NMP; wherein, the lithiated compound is prepared from, by mass, 50% of lithiated material $Li_5FeS_4$ powder with a granularity D50 of 2 μm and 50% of a binder PVDF.

A preparation method of the pre-lithiated film in this embodiment is identical with the preparation method in Embodiment 1.

The pre-lithiated film provided by this embodiment was assembled together with an anode coated with a lithium cobalt oxide anode material, metallic lithium and an electrolyte to form a half-cell, the performance of which was tested. Test results are shown in Table 1.

Contrastive Embodiment 1

A ceramic $Al_2O_3$ membrane, an anode coated with a lithium cobalt oxide anode material, metallic lithium and an electrolyte were assembled to form a half-cell, the performance of which was tested. Test results are shown in Table 1.

Contrastive Embodiment 2

A PP membrane, an anode coated with a lithium cobalt oxide anode material, metallic lithium and an electrolyte were assembled to form a half-cell, the performance of which was tested. Test results are shown in Table 1.

Contrastive Embodiment 3

This contrastive embodiment provides a CuO ceramic membrane, which comprises a base film and a CuO coating coated on one side of the base film, wherein the base film is a porous PP membrane and has a thickness of 16 μm.

Figure 6:
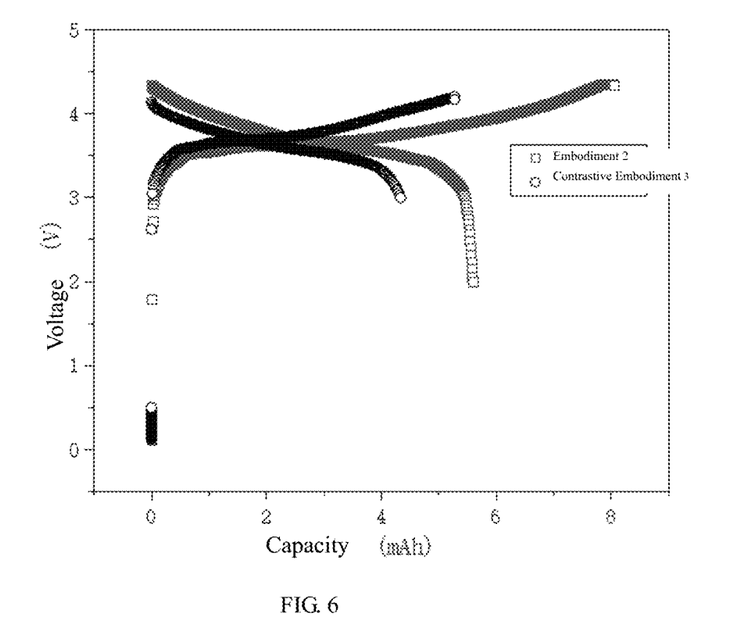
FIG. 6 is a performance test comparison diagram of the pre-lithiated film half-cell provided by Embodiment 2 of the present disclosure and a contrastive Embodiment 3.

The CuO ceramic membrane was assembled together with an anode coated with a NCM anode material, a cathode coated with an SC400 cathode material and an electrolyte to form a half-cell, the performance of which was tested. Test results are shown in FIG. 6.

A preparation method of the pre-lithiated film in this embodiment is identical with the preparation method in Embodiment 1.

TABLE 1

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 | Contrast Embodiment t 1 | Contrast Embodiment t 2 |
|---|---|---|---|---|---|---|---|---|---|---|---|---|---|
| Charge specific capacity (mAh/g) | 210 | 732 | 201 | 180 | 230 | 350 | 200 | 232 | 215 | 220 | 216 | 172 | 167 |
| Discharge specific capacity (mAh/g) | 150 | 153 | 152 | 155 | 160 | 148 | 160 | 163 | 169 | 155 | 153 | 155 | 158 |

The purposes, technical solutions and beneficial effects of the present disclosure are further expounded with reference to the above specific implementations. It should be understood that the above implementations are merely specific ones, and are not intended to limit the protection scope of the present disclosure. Any modifications, equivalent substitutions and improvements obtained based on the spirit and principle of the present disclosure should also fall within the protection scope of the present disclosure.

What is claimed is:

1. A pre-lithiated film, comprising:
    a 1 µm-50 µm base film; and
    a 0.02 µm-100 µm pre-lithiated coating coated on the base film, the pre-lithiated coating including 1 wt %-99.99 wt % of a pre-lithiated material, 0 wt %-98.99 wt % of a coating material, 0.01 wt %-10 wt % of a binder, 0%-10 wt % of a conductive additive material, 0 wt %-2 wt % of a dispersing agent and 0 wt %-2 wt % of an aid;
    wherein:
        the pre-lithiated material is a material that can produce an electrochemical reaction to release lithium ions under voltage control;
        the pre-lithiated material includes $Li_xM1_yA_z$;
        x, y and z are integers or non-integers and satisfy a balance of electrovalence of a chemical formula, x≥1.8; M1 is Cu or Fe; A is one or a combination of more than one of O, F, Cl, S and N elements; wherein, the pre-lithiated material is transformed into a material containing a lithium source or a material not containing a lithium source after charging formation;
        the material containing the lithium source includes: $Li_aM1_bAc$, wherein a, b and c are integers or non-integers and satisfy the balance of electrovalence of a chemical formula; and
        the material not containing the lithium source includes one or a combination of $CuO$, $Cu_2O$, $Fe_2O_3$, $Fe_3O_4$, and $FeO$.

2. The pre-lithiated film according to claim 1, wherein the pre-lithiated material includes one or a combination of several of $Li_2CuO_2$, $Li_5FeO_4$, $Li_{1.8}CuO_{1.8}F_{0.2}$, $Li_{4.8}FeO_{3.8}F_{0.2}$, $Li_5FeO_{3.8}S_{0.2}$, $Li_{1.9}CuO_{1.9}Cl_{0.1}$, $Li_5FeS_4$.

3. The pre-lithiated film according to claim 1, wherein the base film is one or a combination of several of a polypropylene PP membrane, a polyethylene PE membrane, a non-woven membrane, a fiber membrane, a ceramic membrane and a solid electrolyte membrane.

4. The pre-lithiated film according to claim 1, wherein the pre-lithiated material is spherical, ellipsoidal or irregular polygonal particles and has a size of 50 nm-5000 nm.

5. The pre-lithiated film according to claim 1, wherein:
    the coating material includes one or a combination of several of a ceramic material, a polymer material, a piezoelectric material, a heat-conductive material and an electrically conductive material;
    the binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene;
    the conductive additive is one or a mixture of several of carbon black, conductive graphite, carbon fiber, carbon nano tubes, acetylene black, Ketjen carbon, graphene, metallic silver, metallic gold, vapor-grown carbon fiber VGCF, conductive graphite KS-6, and carbon black SUPER-P;
    the dispersing agent is one or more of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispensing agent; and
    the aid is one or a combination of several of polydimethylsiloxane, silicone oil, polyether, sodium polyacrylate, polyvinyl alcohol, sodium alkyl polyoxyethylene ether carboxylate, polyoxyethylene alkyl phenol ether, sodium alkyl benzene sulfonate, alkylphenol polyoxyethylene ether, polyoxyethylene alkyl amine and polyoxyethylene amide.

6. A preparation method of the pre-lithiated film according to claim 1, comprising:
    adding the dispersing agent, the binder, the conductive additive, the aid and the solvent into a pre-mixing tank in a required proportion to be completely dissolved to obtain a first mixture, wherein the solvent is a polar solvent and includes deionized water, N-methylpyrrolidone NMP, ethyl alcohol or Dimethylformamide DMF; the binder is one or a mixture of several of polyvinylidene fluoride, styrene-butadiene rubber latex, styrene-acrylic latex, polyvinyl alcohol, ethylene vinyl acetate, sodium alga acid, polyacrylamide, polymethyl methacrylate-butyl acrylate, ethylene-vinyl acetate copolymer, polyvinyl acetate, polyurethane, hydroxyethyl cellulose, methyl hydroxyethyl cellulose, sodium carboxymethyl cellulose, polyacrylamide, polyoxyethylene and polytetrafluoroethylene; the conductive additive is one or a mixture of several of carbon black, conductive graphite, carbon fiber, carbon nano tubes, acetylene black, Ketjen carbon, graphene, metallic silver, metallic gold, VGCF, KS-6 and SUPER-P; the dispersing agent is one or more of sodium polyacrylate, dodecylbenzene sulfonic acid, lauryl sodium sulfate, sodium hexametaphosphate, polyacrylic acid, hexadecyl trimethyl ammonium bromide, polyethylene glycol, potassium polyacrylate, octylphenol polyoxyethylene and a sulfonate fluorine dispensing agent; the aid is one or a combination of several of polydimethylsiloxane, silicone oil, polyether, sodium polyacrylate, polyvinyl alcohol, sodium alkyl polyoxyethylene ether carboxylate, polyxyethylated alkylphenol, sodium alkyl benzene sulfonate, alkylphenol polyoxyethylene ether, polyoxyethylene alkyl amine and polyoxyethylene amide;

stepwise adding the pre-lithiated material and the pre-lithiated coating material into the first mixture in a required proportion to be stirred at a high speed of 10-5000 rpm and be dispersed to obtain a second mixture, wherein the pre-lithiated material is a material that can produce an electrochemical reaction to release lithium ions under voltage control, and includes $Li_xM1_yA_z$, wherein x, y and z are integers or non-integers and satisfy the balance of electrovalence of the chemical formula; $x \geq 1.8$; $x > y$; M1 is Cu or Fe; wherein, the coating material includes one or a combination of several of a ceramic material, a polymer material, a piezoelectric material, a heat-conductive material and an electrical conductive material;

filtering the second mixture by a screen to obtain coating slurry; and coating the coating slurry on one side or two sides of a base film at a speed of 1 m/min-100 m/min, and drying the base film under a temperature of 40° C.-100° C. to obtain the pre-lithiated film, wherein the base film is any of a PP membrane, a PE membrane, a non-woven membrane and a fiber membrane.

7. The preparation method according to claim 6, wherein before the step of coating the coating slurry on one side or two sides of a base film at a speed of 1 m/min-100 m/min, the method further comprises:

carrying out corona treatment on the base film.

8. A method for pre-lithiating the pre-lithiated film according to claim 1, comprising:

assembling a lithium battery using the pre-lithiated film as a membrane material, wherein a side, coated with the pre-lithiated coating, of the pre-lithiated film is assembled toward an anode of the lithium battery; and charging the assembled lithium battery for formation;

wherein, the lithium battery is classified according to a structural composition, including one or more of a liquid-state lithium battery, a quasi-solid-state lithium battery and a solid-state battery; or the lithium battery is classified according to an outline structure one or more of a cylindrical lithium battery, a square lithium battery, a pouch lithium battery, a laminated lithium battery and a button lithium battery.

9. A lithium battery, comprising the pre-lithiated film according to claim 1.

* * * * *

UNITED STATES PATENT AND TRADEMARK OFFICE
CERTIFICATE OF CORRECTION

PATENT NO. : 12,116,497 B2  
APPLICATION NO. : 17/058988  
DATED : October 15, 2024  
INVENTOR(S) : Zhao Yan, Fei Luo and Hong Li Page 1 of 1

It is certified that error appears in the above-identified patent and that said Letters Patent is hereby corrected as shown below:

In the Specification

Column 2, Line 57, change "$Li_xCu_y(O_{c1}F_{e2})_z$, $Li_x(FeZn)_yO_z$," to --$Li_xCu_y(O_{c1}F_{c2})_z$, $Li_x(FeZn)_yO_z$,--

Column 5, Line 40, change "0.01 wt %-0 wt %" to --0.01 wt %-10 wt %--

In the Claims

Claim 1, Column 13, Line 43, change "$x \geq 1.8$; M1 is" to --$x \geq 1.8$; $x > y$; M1 is--

Signed and Sealed this  
Third Day of December, 2024

*Katherine Kelly Vidal*

Katherine Kelly Vidal  
*Director of the United States Patent and Trademark Office*